US012684510B2

(12) United States Patent
Sengupta et al.

(10) Patent No.: US 12,684,510 B2
(45) Date of Patent: Jul. 14, 2026

(54) NON-TERRESTRIAL NETWORK COMMUNICATIONS

(71) Applicant: QUALCOMM Incorporated, San Diego, CA (US)

(72) Inventors: Ayan Sengupta, San Diego, CA (US); Alberto Rico Alvarino, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 18/306,150

(22) Filed: Apr. 24, 2023

(65) Prior Publication Data

US 2024/0121738 A1 Apr. 11, 2024

Related U.S. Application Data

(60) Provisional application No. 63/378,741, filed on Oct. 7, 2022.

(51) Int. Cl.
*H04W 56/00* (2009.01)
*H04W 84/06* (2009.01)
(52) U.S. Cl.
CPC ........ *H04W 56/0045* (2013.01); *H04W 84/06* (2013.01)
(58) Field of Classification Search
CPC .. H04W 56/00; H04W 56/0045; H04W 84/06
See application file for complete search history.

(56) References Cited

U.S. PATENT DOCUMENTS

| | | | | |
|---|---|---|---|---|
| 2021/0105731 A1* | 4/2021 | Lin | ....................... | H04W 72/23 |
| 2021/0227481 A1* | 7/2021 | Xu | ....................... | H04W 56/005 |
| 2021/0297149 A1* | 9/2021 | Hsieh | ................. | H04B 7/18504 |

(Continued)

FOREIGN PATENT DOCUMENTS

| | | | | |
|---|---|---|---|---|
| CN | 112911699 | * 6/2021 | ........ | H04B 7/18513 |
| WO | 2022035762 A1 | 2/2022 | | |

(Continued)

OTHER PUBLICATIONS

M.-Y. Yun, J. Kim, D. You and M.-S. Lee, "Main features of 5G New Radio for Non-Terrestrial Networks" 2021 International Conference on Information and Communication Technology Convergence (ICTC), Jeju Island, Korea, Republic of, 2021, pp. 1474-1478, doi: 10.1109/ICTC52510.2021.9620941. (Year: 2021).*

(Continued)

*Primary Examiner* — Nishant Divecha
*Assistant Examiner* — Caleb James Ballowe
(74) *Attorney, Agent, or Firm* — Harrity & Harrity, LLP

(57) ABSTRACT

Various aspects of the present disclosure generally relate to wireless communication. In some aspects, a user equipment (UE) may obtain a first value associated with transmitting an uplink communication that corresponds to a downlink communication received in a non-terrestrial network (NTN). The UE may compare the first value to a second value. The UE may selectively transmit the uplink communication, or selectively process the downlink communication, based at least in part on a result of comparing the first value to the second value. Numerous other aspects are described.

30 Claims, 7 Drawing Sheets

(56)      References Cited

U.S. PATENT DOCUMENTS

| | | | |
|---|---|---|---|
| 2021/0314889 A1 | 10/2021 | Rico Alvarino et al. | |
| 2022/0124660 A1* | 4/2022 | Cheng | H04W 80/02 |
| 2022/0232504 A1* | 7/2022 | Cozzo | H04B 7/18513 |
| 2023/0039715 A1* | 2/2023 | Ye | H04B 7/19 |
| 2023/0217397 A1* | 7/2023 | Zhou | H04B 7/18513 |
| | | | 370/503 |
| 2023/0247673 A1* | 8/2023 | Xu | H04B 7/18563 |
| | | | 370/329 |
| 2023/0254794 A1* | 8/2023 | Park | H04B 7/18513 |
| | | | 370/316 |
| 2023/0284165 A1* | 9/2023 | Ye | H04W 56/009 |
| | | | 370/503 |
| 2023/0397196 A1* | 12/2023 | Nishio | H04L 5/0094 |
| 2024/0031072 A1* | 1/2024 | Wu | H04L 1/1812 |
| 2024/0163826 A1* | 5/2024 | Medles | H04B 7/1851 |
| 2024/0179592 A1* | 5/2024 | Suh | H04W 36/083 |
| 2024/0313855 A1* | 9/2024 | Yao | H04L 5/0094 |

FOREIGN PATENT DOCUMENTS

| | | | | |
|---|---|---|---|---|
| WO | WO-2022031146 A1 * | 2/2022 | .......... | H04B 7/1851 |
| WO | 2022052562 A1 | 3/2022 | | |
| WO | WO-2023174957 A1 * | 9/2023 | | |
| WO | WO-2024014818 A1 * | 1/2024 | | |

OTHER PUBLICATIONS

International Search Report and Written Opinion—PCT/US2023/070962—ISA/EPO—Mar. 18, 2024.

Partial International Search Report—PCT/US2023/070962—ISA/EPO—Jan. 26, 2024.

ZTE Corporation, et al., "RRM Requirements for SDT", 3GPP TSG-RAN4#101-e, R4-2118590, 3rd Generation Partnership Project, Mobile Competence Centre, 650, Route Des Lucioles, F-06921 Sophia-Antipolis Cedex, France, vol. RAN WG4, No. Electronic meeting, Nov. 1, 20211-Nov. 12, 2021, Oct. 22, 2021, XP052069979, 4 Pages, The Whole Document.

* cited by examiner

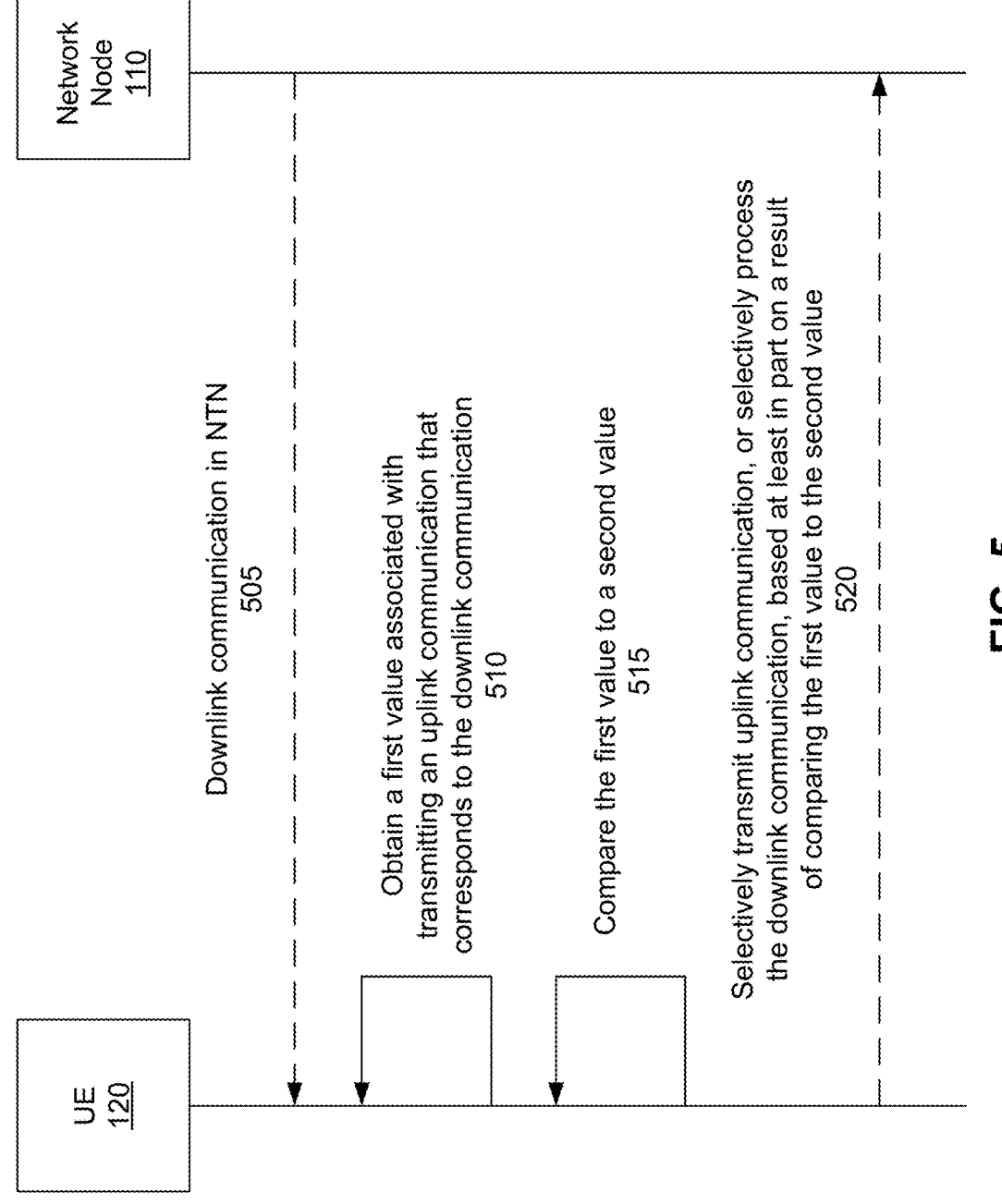

Network Node 110

UE 120

Downlink communication in NTN
505

Obtain a first value associated with
transmitting an uplink communication that
corresponds to the downlink communication
510

Compare the first value to a second value
515

Selectively transmit uplink communication, or selectively process
the downlink communication, based at least in part on a result
of comparing the first value to the second value
520

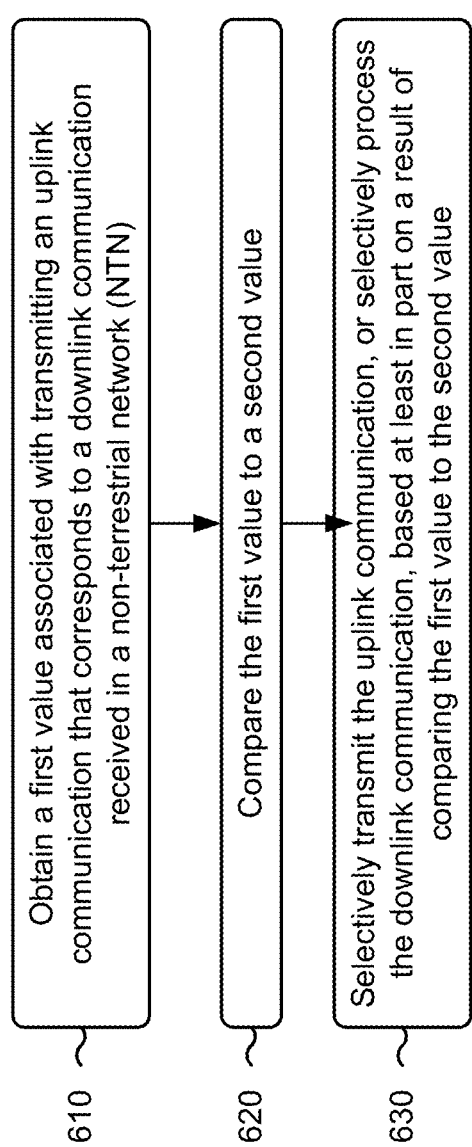

600

610 Obtain a first value associated with transmitting an uplink communication that corresponds to a downlink communication received in a non-terrestrial network (NTN)

620 Compare the first value to a second value

630 Selectively transmit the uplink communication, or selectively process the downlink communication, based at least in part on a result of comparing the first value to the second value

FIG. 6

NON-TERRESTRIAL NETWORK COMMUNICATIONS

CROSS-REFERENCE TO RELATED APPLICATION

This Patent Applications claims priority to U.S. Provisional Patent Application No. 63/378,741, filed on Oct. 7, 2022, entitled "NON-TERRESTRIAL NETWORK COMMUNICATIONS," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for user equipment processing time for non-terrestrial network communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining a first value associated with transmitting an uplink communication that corresponds to a downlink communication received in a non-terrestrial network (NTN). The method may include comparing the first value to a second value. The method may include selectively transmitting the uplink communication, or selectively processing the downlink communication, based at least in part on a result of comparing the first value to the second value.

Some aspects described herein relate to an apparatus for wireless communication performed by a UE. The apparatus may include one or more memories and one or more processors, coupled to the one or more memories. The one or more processors may be configured to obtain a first value associated with transmitting an uplink communication that corresponds to a downlink communication received in an NTN. The one or more processors may be configured to compare the first value to a second value. The one or more processors may be configured to selectively transmit the uplink communication, or selectively process the downlink communication, based at least in part on a result of comparing the first value to the second value.

Some aspects described herein relate to a non-transitory computer-readable medium that stores a set of instructions for wireless communication by a UE. The set of instructions, when executed by one or more processors of the UE, may cause the UE to obtain a first value associated with transmitting an uplink communication that corresponds to a downlink communication received in an NTN. The set of instructions, when executed by one or more processors of the UE, may cause the UE to compare the first value to a second value. The set of instructions, when executed by one or more processors of the UE, may cause the UE to selectively transmit the uplink communication, or selectively process the downlink communication, based at least in part on a result of comparing the first value to the second value.

Some aspects described herein relate to an apparatus for wireless communication. The apparatus may include means for obtaining a first value associated with transmitting an uplink communication that corresponds to a downlink communication received in an NTN. The apparatus may include means for comparing the first value to a second value. The apparatus may include means for selectively transmitting the uplink communication, or selectively processing the downlink communication, based at least in part on a result of comparing the first value to the second value.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a UE processing time for NTN communications, in accordance with the present disclosure.

FIG. 6 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
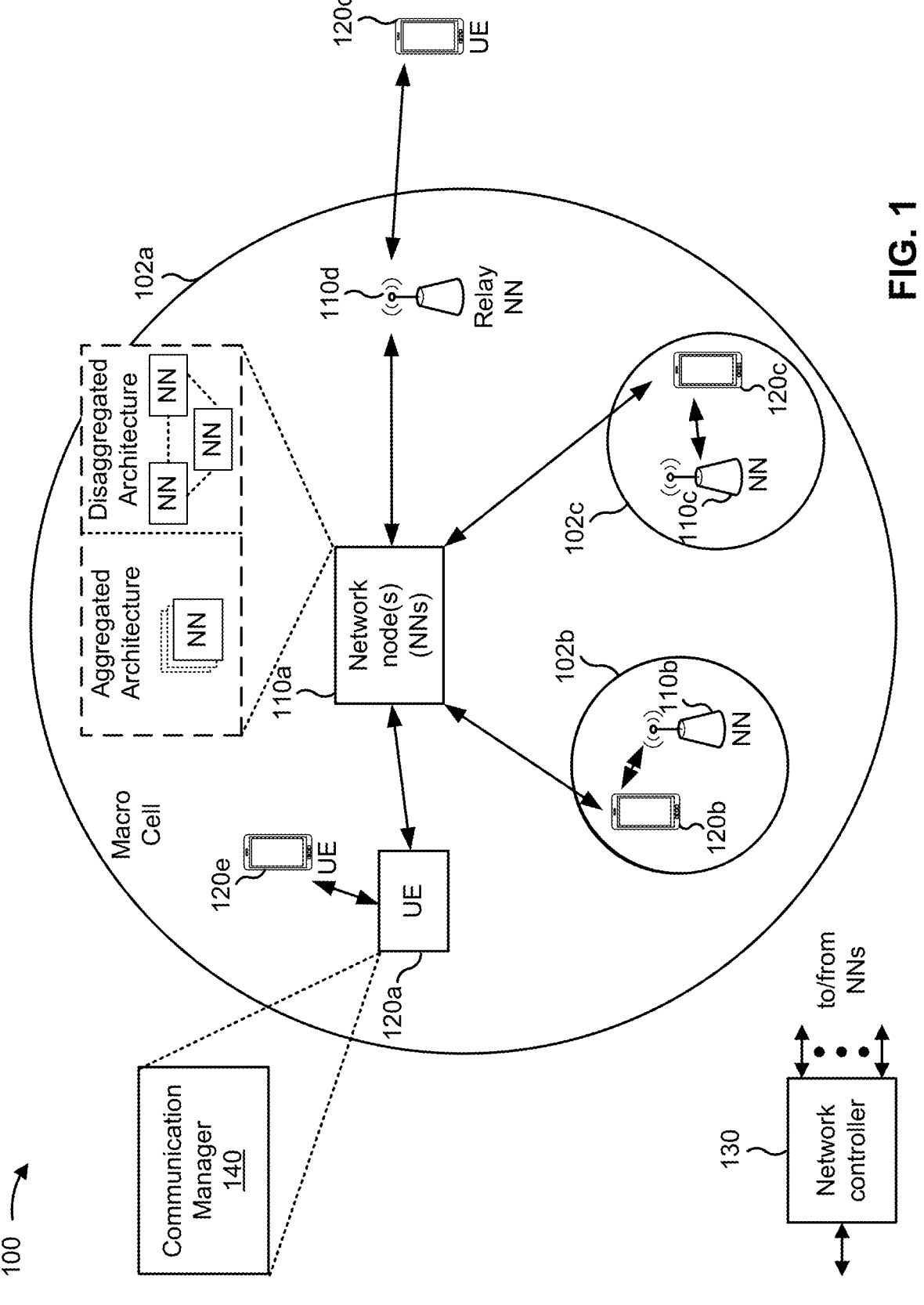
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain a first value associated with transmitting an uplink communication that corresponds to a downlink communication received in a non-terrestrial network (NTN); compare the first value to a second value; and selectively transmit the uplink communication, or selectively process the downlink communication, based at least in part on a result of comparing the first value to the second value. Additionally, or alternatively, the communication manager 140 may perform one or more other operations described herein.

As indicated above, FIG. 1 is provided as an example. Other examples may differ from what is described with regard to FIG. 1.

Figure 2:
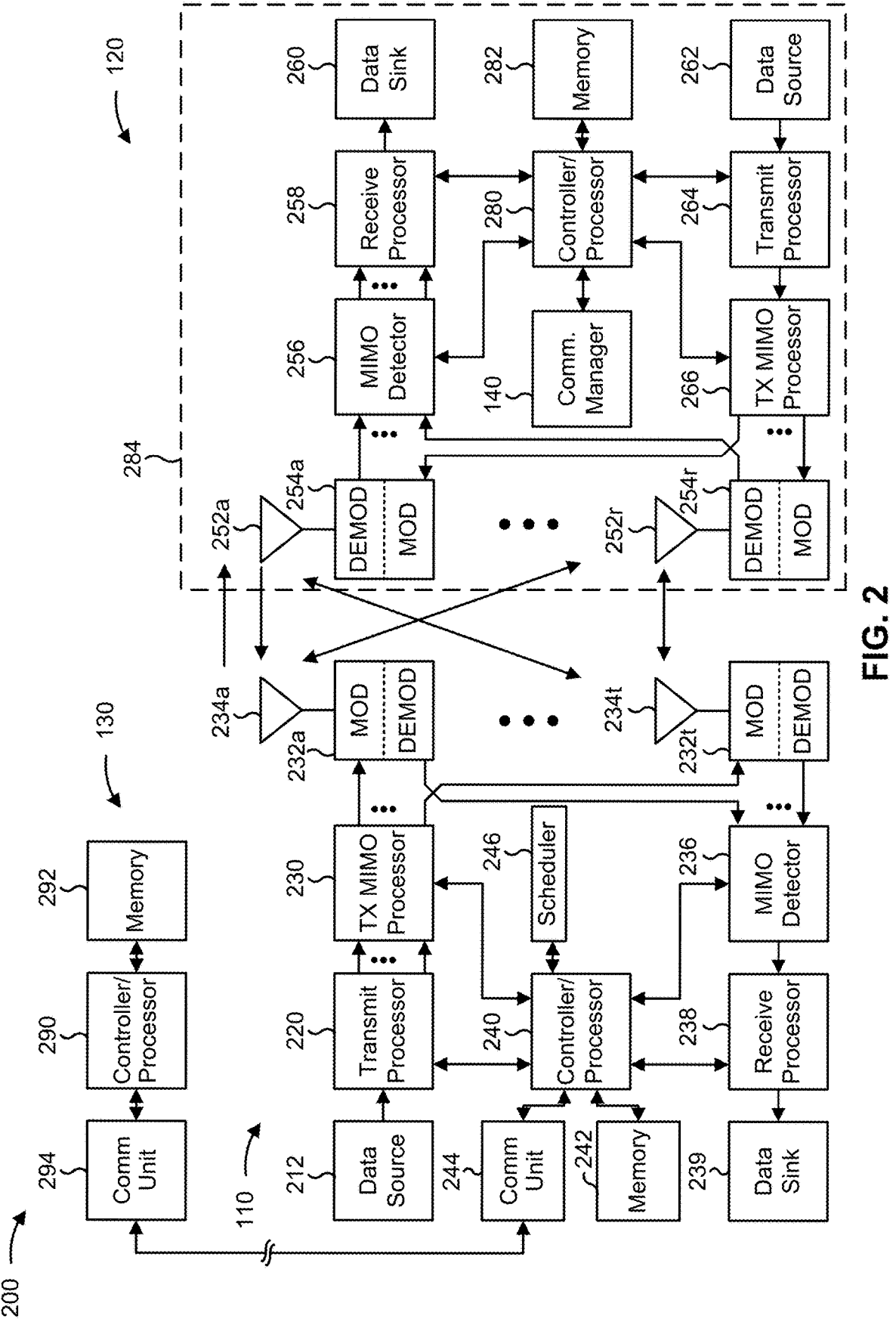
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the network node 110, the controller/processor 280 of the UE 120, and/or any other component(s) of FIG. 2 may perform one or more techniques associated with UE processing time for NTN communications, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (such as the UE 120) includes means for obtaining a first value associated with transmitting an uplink communication that corresponds to a downlink communication received in an NTN; means for comparing the first value to a second value; and/or means for selectively transmitting the uplink communication, or selectively processing the downlink communication, based at least in part on a result of comparing the first value to the second value. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
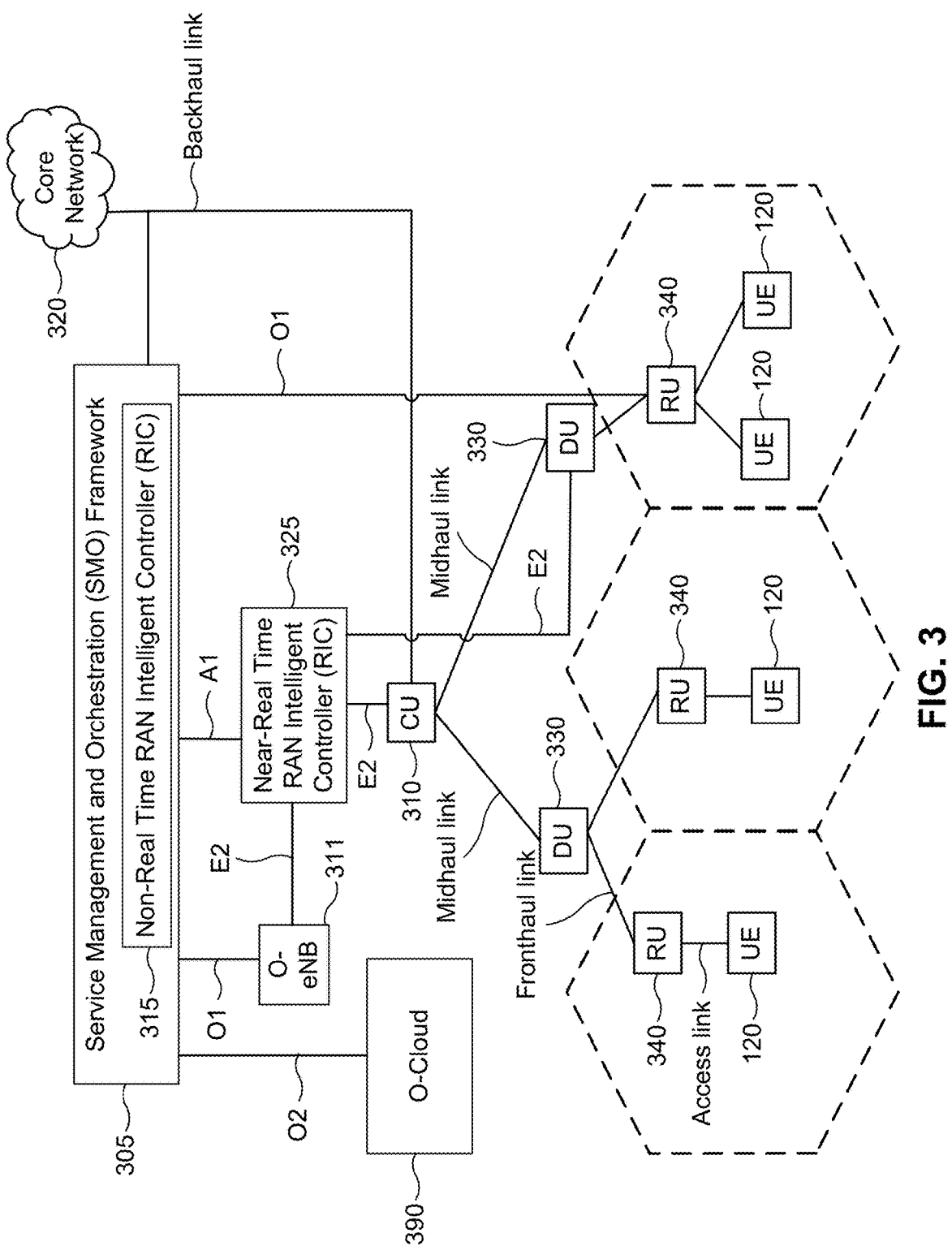
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
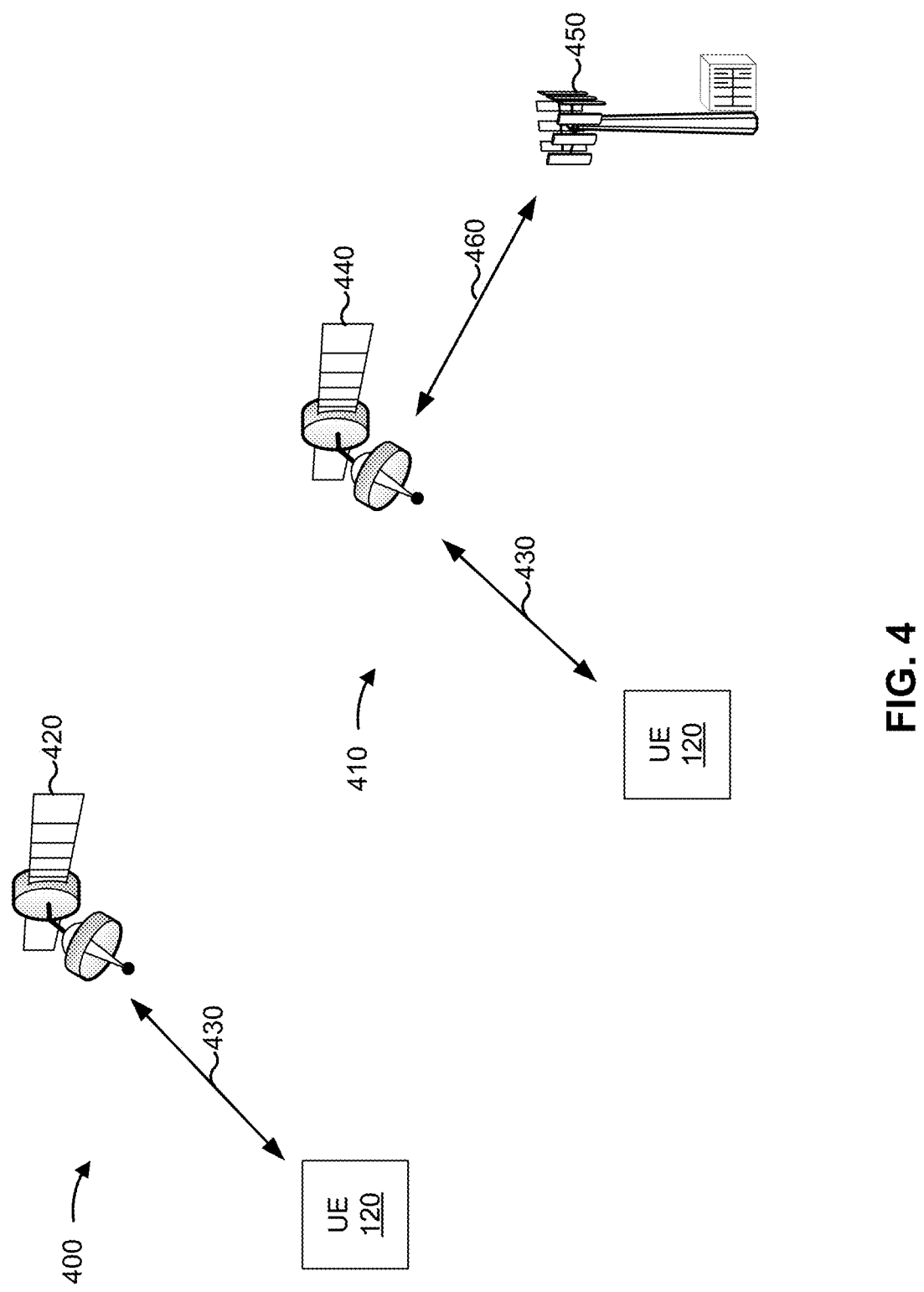
FIG. 4 is a diagram illustrating an example of a regenerative satellite deployment and an example of a transparent satellite deployment in a non-terrestrial network (NTN).

FIG. 4 is a diagram illustrating an example 400 of a regenerative satellite deployment and an example 410 of a transparent satellite deployment in a non-terrestrial network.

Example 400 shows a regenerative satellite deployment. In example 400, a UE 120 is served by a satellite 420 via a service link 430. For example, the satellite 420 may include a network node 110 (e.g., network node 110a) or a gNB. In some aspects, the satellite 420 may be referred to as a non-terrestrial base station, a regenerative repeater, or an on-board processing repeater. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U (not shown in FIG. 4) and a downlink of the service link 430 may be indicated by reference number 430-D (not shown in FIG. 4). Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

In some cases, the UE 120 may need an amount of processing time for processing a downlink communication (e.g., a downlink signal) in an NTN. The processing time may correspond to a time that is between a first time at which the UE 120 receives the downlink communication in the NTN and a second time at which the UE 120 transmits an uplink communication in the NTN that corresponds to the downlink communication. The UE 120 may be a low complexity UE, such as narrowband (NB)-IoT UE. In some cases, a configured processing time may be based at least in part on conditions associated with a terrestrial network (TN). However, a communication that occurs in an NTN may have one or more components that are not included in a communication that occurs in a TN. For example, the communication in the NTN may have one or more timing relationship components for communications having uplink and downlink interactions, such as a narrowband physical downlink shared channel (NPDSCH) communication that triggers a hybrid automatic repeat request acknowledgement (HARQ-ACK). Some example timing relationship components may include an NTN scheduling offset ($K_{offset}$), a UE-specific timing advance value (UE-specific TA) that is based at least in part on a round trip time between the UE 120 and a network node (such as the satellite 420 or the satellite 440), and a common timing advance value (common-TA) that is based at least in part on a feeder link round trip time (such as feeder link 460). The values of these timing relationship components may impact the UE 120 (e.g., the NB-IoT UE) in terms of maintaining sufficient processing times.

In one example, the downlink communication in the NTN may be an NPDSCH that requests a HARQ-ACK. The UE 120 may receive the NPDSCH in a slot that ends in subframe n (which may be an NB-IoT subframe). In this case, the UE 120 may start the transmission of the HARQ-ACK after the end of:

$$n + k_0' + K_{offset} - 1 \text{ DL subframe for frequency division}$$
$$\text{duplexing (FDD), where}$$

$k_0'$ is a scheduling offset associated with the NPDSCH. In FDD for TN communications, $K_{offset}$ may be equal to zero ($K_{offset}=0$). In this case, the processing time that the UE 120 has to generate the HARQ-ACK may be:

$$k_0' - 1 - [T_{TA,terrestrial}], \text{ where}$$

$T_{TA,terrestrial}$ is a timing advance value for terrestrial communications, and $[T_{TA,terrestrial}]$ is the timing advance value for terrestrial communications normalized to a time unit, such as a time unit of slots or subframes.

For legacy TN communications (e.g., non-FDD communications), the timing advance value for terrestrial communications ($T_{TA,terrestrial}$) may be very small. Thus, the minimum processing time that the UE 120 needs for TN communications is:

$$T_{proc,terrestrial}^{min} = k_0'^{,min} - 1 - [T_{TA,terrestrial}^{max}], \text{ where } T_{proc,terrestrial}^{min}$$

is the minimum processing time that is needed for processing a TN communication, and $k_0'^{,min}$ is a minimum scheduling offset associated with the NPDSCH.

The timing advance value for NTN communications may be larger than the timing advance value for TN communications. In some cases, the timing advance value for a communication in an NTN network may be:

$$T_{TA,NTN} = \left( N_{TA} + N_{TA,offset} + N_{TA,adj}^{common} + N_{TA,adj}^{UE} \right) T_s =$$
$$T_{TA,terrestrial} + \left( N_{TA,adj}^{common} + N_{TA,adj}^{UE} \right) T_s,$$

where
$T_{TA,NTN}$ is an NTN timing advance value,
$N_{TA}$ is a timing advance value for the UE 120,
$N_{TA,offset}$ is a fixed timing advance offset that can be used by the UE 120 to calculate a timing advance to be applied to an uplink transmission, $$N_{TA,adj}^{common}$$

is a component of the NTN timing advance value that is based at least in part on the feeder link round trip time, $$N_{TA,adj}^{UE}$$

is a component of the NTN timing advance value that is based at least in part on the network node-to-UE (e.g., satellite-to-UE) round trip time, and $T_s$ is a constant that is equal to $1/(15000 \times 2048)$ seconds.

In some cases, due to the (non-zero) $K_{offset}$ in the NTN, the processing time that the UE 120 has in the NTN to generate the HARQ-ACK may be:

$$k_0' - 1 + K_{offset} - [T_{TA,NTN}], \text{ where}$$

$[T_{TA,NTN}]$ is the NTN timing advance value that is normalized to a time unit, such as a time unit of slots or subframes.

In some cases, a processing time that is available for the UE 120 to generate and/or transmit an uplink communication may be smaller than a terrestrial processing time for a given scheduling offset. For example, if $$K_{offset} < [(N_{TA,adj}^{common} + N_{TA,adj}^{UE})T_s],$$

the processing time that is available for the UE 120 to generate a HARQ-ACK and/or transmit the HARQ-ACK in response to an NPDSCH communication may be smaller than a terrestrial processing time for a given value of $$k_0'.$$

This may occur, for example, when the UE 120 is located at a cell edge and/or in a cell where $K_{offset}$ is not configured conservatively, among other examples. In this case, the UE 120 may not be able to meet the shorter processing time requirement, such as the terrestrial network processing time requirement. This may result in disrupted communications between the UE 120 and the network node 110 (e.g., the satellite 420 or the satellite 440), and may result in wasted energy and processing resources of the UE 120.

Techniques and apparatuses are described herein for a UE processing time for NTN communications. In some aspects, a UE may receive a downlink communication in an NTN. The downlink communication may be, for example, an NPDSCH communication. The UE may obtain a first value, such as a first processing time associated with transmitting an uplink communication that corresponds to the downlink communication in the NTN. For example, the UE may calculate a first processing time associated with transmitting a HARQ-ACK that corresponds to the NPDSCH communication in the NTN. The UE may compare the first value to a second value. The second value may be based at least in part on a scheduling offset or a time value. The UE may selectively transmit the uplink communication based at least in part on comparing the first value to the second value. For example, the UE may transmit the HARQ-ACK based at least in part on the first value being greater than or equal to the second value, or may refrain from transmitting the HARQ-ACK based at least in part on the first value being less than the second value. This may improve communication reliability between the UE and the network node (e.g., the satellite), and may result in lower energy consumption by the UE.

As indicated above, FIG. 4 is provided as an example. Other examples may differ from what is described with regard to FIG. 4.

FIG. 5 is a diagram illustrating an example 500 of a UE processing time for NTN communications, in accordance with the present disclosure. The UE 120 may communicate with the network node 110 using NTN communications. The network node 110 may be a satellite, such as the satellite 420 or the satellite 440, or may be another NTN node capable of NTN communications.

As shown by reference number 505, the network node 110 may transmit, and the UE 120 may receive, a downlink communication. The downlink communication may be an NTN downlink communication, such as a downlink communication that is received in an NTN network. In some aspects, the downlink communication may be an NPDSCH that requests a HARQ-ACK.

As shown by reference number 510, the UE 120 may obtain a first value. The first value may be a first processing time that is associated with the UE 120 processing the downlink communication and/or may be based at least in part on one or more of the values described herein, such as the NTN scheduling offset ($K_{offset}$) or the scheduling offset associated with the downlink communication $$(k_0'),$$

among other examples. In some aspects, the UE 120 may obtain the first value based at least in part on UE configuration information and/or information received from the network node 110. Additionally, or alternatively, the UE 120 may calculate the first value based at least in part on the UE configuration information or the information received from the network node 110.

As shown by reference number 515, the UE 120 may compare the first value to a second value. The second value may be a second processing time and/or may be based at least in part on one or more of the values described herein, such as the NTN timing advance value ($T_{TA,NTN}$), one or more components of the NTN timing advance value such as the component of the NTN timing advance value that is based at least in part on the feeder link round trip time $$(N_{TA,adj}^{common})$$

or the component of the NTN timing advance value that is based at least in part on the satellite-to-UE round trip time $$(N_{TA,adj}^{UE}),$$

the minimum processing time for processing TN communications $$(T_{proc,terrestrial}^{min}),$$

or a minimum processing time value (e.g., a minimum physical time), among other examples.

As shown by reference number 520, the UE 120 may selectively transmit the uplink communication, or selectively process the downlink communication, based at least in part on a result of comparing the first value to the second value (for example, based at least in part on a result of comparing the first processing time to the second processing time).

In a first example, the first value may be the NTN scheduling offset ($K_{offset}$) or may be based at least in part on the NTN scheduling offset ($K_{offset}$). The second value may be based at least in part on the component of the NTN timing advance value that is associated with the feeder link round trip time $$(N_{TA,adj}^{common}),$$

the component of the NTN timing advance value that is associated with the satellite-to-UE round trip time $$\left(N_{TA,adj}^{UE}\right),$$

and the constant ($T_s$). For example, the second value may be based at least in part on $$\left(\left(N_{TA,adj}^{common} + N_{TA,adj}^{UE}\right)T_s\right).$$

In this example, the UE 120 may not transmit the uplink communication when the first value is less than the second value. Alternatively, the UE 120 may transmit the uplink communication when the first value is greater than or equal to the second value. For example, the UE 120 may refrain from transmitting the uplink communication (such the HARQ-ACK) corresponding the downlink communication (such as the NPDSCH) when $$K_{offset} < \left(\left(N_{TA,adj}^{common} + N_{TA,adj}^{UE}\right)T_s\right).$$

Alternatively, the UE 120 may transmit the uplink communication when $$K_{offset} \ge \left(\left(N_{TA,adj}^{common} + N_{TA,adj}^{UE}\right)T_s\right).$$

In a second example, the first value may be a processing time that is needed for the UE 120 to generate and/or transmit the uplink communication, or may be based at least in part on the processing time that is needed for the UE 120 to generate and/or transmit the uplink communication. In this example, the first value may be a first processing time that is based at least in part on the NTN scheduling offset ($K_{offset}$), the scheduling offset associated with the downlink communication $$\left(k_0'\right),$$

and the NTN timing advance value ($T_{TA,NTN}$). For example, the UE 120 may calculate the first processing time based at least in part on $$\left(k_0' - 1 + K_{offset} - [T_{TA,NTN}]\right).$$

The second value may be the minimum processing time for processing TN communications $$\left(T_{proc,terrestrial}^{min}\right).$$

In some aspects, the minimum processing time for processing TN communications $$\left(T_{proc,terrestrial}^{min}\right)$$

may be equal to $$k_0'^{min} - 1 - T_{TA,terrestrial}^{max}, \text{ where } T_{TA,terrestrial}^{max}$$

is the maximum processing time that is needed for processing TN communications. In this example, the UE 120 may transmit the uplink communication when the first value is greater than or equal to the second value. Alternatively, the UE 120 may not transmit the uplink communication when the first value is less than the second value. For example, the UE 120 may transmit the uplink communication when $$\left(k_0' - 1 + K_{offset} - [T_{TA,NTN}]\right) \ge T_{proc,terrestrial}^{min}.$$

Alternatively, the UE 120 may refrain from transmitting the uplink communication when $$\left(k_0' - 1 + K_{offset} - [T_{TA,NTN}]\right) < T_{proc,terrestrial}^{min}.$$

In a third example, the UE 120 may be configured with a plurality of values for the scheduling offset $$\left(k_0'\right)$$

that are specific to the NTN. The UE 120 may select a scheduling offset from the plurality of scheduling offsets such that the processing time that is available for the UE 120 to generate and/or transmit the uplink communication is greater than or equal to the processing time that is needed for the UE 120 to generate and/or transmit the uplink communication. In one example, $K_{offset}$ may be equal to 4 ms, $[T_{TA,NTN}]$ may be equal to 7 ms, and $$T_{proc,terrestrial}^{min}$$

may be equal to 11 ms. The UE 120 may be configured with a plurality of scheduling offsets $$\left(k_0'\right)$$

that are equal to 13 ms, 14 ms, 15 ms, and 16 ms. The UE 120 may select a scheduling offset $$\left(k_0'\right)$$

such that $$\left(k_0' - 1 + K_{offset} - [T_{TA,NTN}]\right) \ge T_{proc,terrestrial}^{min}$$

for NTN communications. For example, the UE 120 may select a value of 15 ms (or 16 ms) such that $$\left(k_0' - 1 + K_{offset} - [T_{TA,NTN}]\right) \ge T_{proc,terrestrial}^{min}.$$

In this case, the scheduling offset $$(k_0')$$

may be 15 ms (or 16 ms) for NTN communications but may be 11 ms for TN communications. If the UE 120 is not configured with a scheduling offset $$(k_0')$$

that satisfies $$\left(k_0' - 1 + K_{offset} - [T_{TA,NTN}]\right) \ge T_{proc,terrestrial}^{min}$$

for NTN communications, the UE 120 may refrain from transmitting the uplink communication.

In a fourth example, the UE 120 may be configured with a minimum processing time (in ms), such as a minimum physical time for processing downlink communications in an NTN. In this example, the second value may be equal to the minimum processing time. The UE 120 may transmit the uplink communication if the time that is needed for the UE 120 to generate and/or transmit the uplink communication (e.g., the first value) is greater than or equal to the minimum processing time. Alternatively, the UE 120 may not transmit the uplink communication if the time that is needed for the UE 120 to generate and/or transmit the uplink communication is less than the minimum processing time.

In a fifth example, the UE 120 may not transmit (e.g., may refrain from transmitting) a portion of the uplink communication that occurs before the minimum processing time $$\left(T_{proc,terrestrial}^{min}\right).$$

For example, the UE 120 may drop one or more slots, one or more symbols, one or more subframes, or one or more repetitions of the uplink communication that are scheduled before the minimum processing time $$\left(T_{proc,terrestrial}^{min}\right).$$

Additionally, or alternatively, the UE 120 may transmit the uplink communication (e.g., the portion of the uplink communication or another portion of the uplink communication) after the minimum processing time $$\left(T_{proc,terrestrial}^{min}\right).$$

In some aspects, the UE 120 may selectively transmit the uplink communication based at least in part on any combination of the first example, the second example, the third example, the fourth example, and the fifth example. For example, the UE 120 may transmit the uplink communication if $$K_{offset} < \left(N_{TA,adj}^{common} + N_{TA,adj}^{UE}\right)T_s\right)$$

and if $\left(k_0' - 1 + K_{offset} - [T_{TA,NTN}]\right) \ge T_{proc,terrestrial}^{min}$.

Alternatively, the UE 120 may not transmit the uplink communication if $$K_{offset} < \left(N_{TA,adj}^{common} + N_{TA,adj}^{UE}\right)T_s\right) \text{ or if } \left(k_0' - 1 + K_{offset} - [T_{TA,NTN}]\right) \ge$$

$$T_{proc,terrestrial}^{min}.$$

In some aspects, the downlink communication may be an NPDSCH that triggers a HARQ-ACK, the uplink communication may be a HARQ-ACK, and the scheduling offset may be the scheduling offset $$k_0'.$$

However, the techniques and apparatuses described herein may be applied to any type of downlink and uplink combination. For example, the downlink communication may be a narrowband physical downlink control channel (NPDCCH) communication that triggers a narrowband physical uplink shared channel (NPUSCH) communication, the uplink communication may be the NPUSCH communication, and the scheduling offset may be a scheduling offset $k_0$. In another example, the downlink communication may be an NPDCCH communication that triggers a physical downlink control channel (PDCCH) ordered narrowband physical radio access channel (NPRACH) communication, the uplink communication may be the PDCCH ordered NPRACH communication, and the scheduling offset may be a scheduling offset $k_2$.

In some aspects, the UE 120 may initiate (e.g., declare) a radio link failure (RLF), may transition to an idle state of the UE, or may wait to be released from a connection to the network node 110. For example, the UE 120 may initiate the RLF, may transition to the idle state, or may wait to be released from the connection to the network node 110 based at least in part on the configured NTN scheduling offset being less than the NTN timing advance value (e.g., in accordance with the first example). In another example, the UE 120 may initiate the RLF, may transition to the idle state, or may wait to be released from the connection to the network node 110 based at least in part on the first processing time being less than the second processing time (e.g., in accordance with the second example). In another example, the UE 120 may initiate the RLF, may transition to the idle state, or may wait to be released from the connection to the network node 110 based at least in part on the first value being less than the minimum physical time (e.g., in accordance with the fourth example). In some aspects, the UE 120 may wait a certain amount of time (e.g., in terms of ms, slots, subframes, etc.) during which the processing time requirements are not satisfied before initiating the RLF. In some aspects, there may be a recovery period before the UE 120 initiates the RLF. During the recovery period, the UE 120 may request a different $K_{offset}$ from the network, or may try to re-acquire a $K_{offset}$ in case it is updated by the network.

As described herein, a processing time that is available for the UE 120 to generate and/or transmit an uplink communication may be smaller than a terrestrial processing time for a given scheduling offset. For example, if $$K_{offset} < \left[ (N_{TA,adj}^{common} + N_{TA,adj}^{UE}) T_s \right],$$

the processing time that is available for the UE 120 to generate a HARQ-ACK and/or transmit the HARQ-ACK in response to an NPDSCH communication may be smaller than a terrestrial processing time for a given value of $$k_0'.$$

This may occur, for example, when the UE 120 is located at a cell edge and/or in a cell where $K_{offset}$ is not configured conservatively, among other examples. In this case, the UE 120 may not be able to meet the shorter processing time requirement, such as the TN processing time requirement. This may result in disrupted communications between the UE 120 and the network node 110 (e.g., the satellite 420 or the satellite 440), and may result in wasted energy and processing resources of the UE 120. Using the techniques and apparatuses described herein, the UE 120 may obtain a first value, such as a first processing time associated with transmitting an uplink communication that corresponds to a downlink communication in the NTN. The UE 120 may compare the first value to a second value. The second value may be based at least in part on a scheduling offset or a time value. The UE 120 may selectively transmit an uplink communication based at least in part on comparing the first value to the second value. For example, the UE 120 may transmit a HARQ-ACK based at least in part on the first value being greater than or equal to the second value, or may refrain from transmitting the HARQ-ACK based at least in part on the first value being less than the second value. This may improve communication reliability between the UE 120 and the network node 110, and may result in lower energy consumption by the UE 120.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with UE processing time for NTN communications.

As shown in FIG. 6, in some aspects, process 600 may include obtaining a first value associated with transmitting an uplink communication that corresponds to a downlink communication received in an NTN (block 610). For example, the UE (e.g., using communication manager 140 and/or obtaining component 708, depicted in FIG. 7) may obtain a first value associated with transmitting an uplink communication that corresponds to a downlink communication received in an NTN, as described above in connection with FIG. 5.

As further shown in FIG. 6, in some aspects, process 600 may include comparing the first value to a second value (block 620). For example, the UE (e.g., using communication manager 140 and/or comparison component 710, depicted in FIG. 7) may compare the first value to a second value, as described above in connection with FIG. 5.

As further shown in FIG. 6, in some aspects, process 600 may include selectively transmitting the uplink communication, or selectively processing the downlink communication, based at least in part on a result of comparing the first value to the second value (block 630). For example, the UE (e.g., using communication manager 140 and/or transmission component 704, depicted in FIG. 7) may selectively transmit the uplink communication, or selectively process the downlink communication, based at least in part on a result of comparing the first value to the second value, as described above in connection with FIG. 5.

Process 600 may include additional aspects, such as any single aspect or any combination of aspects described below and/or in connection with one or more other processes described elsewhere herein.

In a first aspect, obtaining the first value comprises calculating the first value based at least in part on one or more configured values.

In a second aspect, alone or in combination with the first aspect, the first value corresponds to a configured NTN scheduling offset and the second value corresponds to an NTN timing advance value.

In a third aspect, alone or in combination with one or more of the first and second aspects, the NTN timing advance value is based at least in part on one or more of a common timing advance value, a UE-specific timing advance value, or a constant.

In a fourth aspect, alone or in combination with one or more of the first through third aspects, selectively transmitting the uplink communication based at least in part on the result of comparing the first value to the second value comprises transmitting the uplink communication based at least in part on the configured NTN scheduling offset being greater than or equal to the NTN timing advance value, or refraining from transmitting the uplink communication, or refraining from processing the downlink communication, based at least in part on the configured NTN scheduling offset being less than the NTN timing advance value.

In a fifth aspect, alone or in combination with one or more of the first through fourth aspects, process 600 includes initiating a radio link failure, transitioning to an idle state, or waiting to be released from a connection by a network node based at least in part on the configured NTN scheduling offset being less than the NTN timing advance value.

In a sixth aspect, alone or in combination with one or more of the first through fifth aspects, the first value is a first processing time that corresponds to a time between receiving the downlink communication and transmitting the uplink communication, and the second value is a second processing time that corresponds to a minimum processing time for communications in a terrestrial network.

In a seventh aspect, alone or in combination with one or more of the first through sixth aspects, the first processing time is based at least in part on one or more of a configured scheduling offset, an NTN-specific scheduling offset, or an NTN timing advance value.

In an eighth aspect, alone or in combination with one or more of the first through seventh aspects, the second processing time is based at least in part on one or more of a minimum configured scheduling offset or a maximum timing advance value for communications in the terrestrial network.

In a ninth aspect, alone or in combination with one or more of the first through eighth aspects, selectively transmitting the uplink communication based at least in part on the result of comparing the first value to the second value comprises transmitting the uplink communication based at least in part on the first processing time being greater than or equal to the second processing time, or refraining from transmitting the uplink communication, or refraining from processing the downlink communication, based at least in part on the first processing time being less than the second processing time.

In a tenth aspect, alone or in combination with one or more of the first through ninth aspects, process 600 includes initiating a radio link failure, transitioning to an idle state, or waiting to be released from a connection by a network node based at least in part on the first processing time being less than the second processing time.

In an eleventh aspect, alone or in combination with one or more of the first through tenth aspects, the first value is based at least in part on a scheduling offset, the UE is configured with a plurality of scheduling offsets that includes the scheduling offset, and at least a portion of the plurality of scheduling offsets are specific to NTN.

In a twelfth aspect, alone or in combination with one or more of the first through eleventh aspects, process 600 includes selecting a scheduling offset from the plurality of scheduling offsets such that the first value that corresponds to a first processing time is greater than or equal to the second value that corresponds to a second processing time.

In a thirteenth aspect, alone or in combination with one or more of the first through twelfth aspects, the second value is a minimum physical time for the UE to process the downlink communication.

In a fourteenth aspect, alone or in combination with one or more of the first through thirteenth aspects, selectively transmitting the uplink communication based at least in part on the result of comparing the first value to the second value comprises transmitting the uplink communication based at least in part on the first value being greater than or equal to the minimum physical time, or refraining from transmitting the uplink communication, or refraining from processing the downlink communication, based at least in part on the first value being less than the minimum physical time.

In a fifteenth aspect, alone or in combination with one or more of the first through fourteenth aspects, process 600 includes initiating a radio link failure, transitioning to an idle state, or waiting to be released from a connection by a network node based at least in part on the first value being less than the minimum physical time.

In a sixteenth aspect, alone or in combination with one or more of the first through fifteenth aspects, selectively transmitting the uplink communication comprises refraining from transmitting a portion of the uplink communication that occurs before a minimum processing time for communications associated with a terrestrial network.

In a seventeenth aspect, alone or in combination with one or more of the first through sixteenth aspects, refraining from transmitting the portion of the uplink communication comprises dropping a slot, a symbol, a subframe, a repetition unit, or a repetition associated with the uplink communication.

In an eighteenth aspect, alone or in combination with one or more of the first through seventeenth aspects, refraining from transmitting the portion of the uplink communication comprises transmitting the portion of the uplink communication after the minimum processing time for communications associated with the terrestrial network.

In a nineteenth aspect, alone or in combination with one or more of the first through eighteenth aspects, the downlink communication is a narrowband physical downlink shared channel (NPDSCH) communication, the uplink communication is a hybrid automatic repeat request acknowledgement (HARQ-ACK), and the first value is based at least in part on a scheduling offset associated with the NPDSCH communication and the HARQ-ACK.

In a twentieth aspect, alone or in combination with one or more of the first through nineteenth aspects, the downlink communication is a narrowband physical downlink control channel (NPDCCH) communication, the uplink communication is a narrowband physical uplink shared channel (NPUSCH) communication, and the first value is based at least in part on a scheduling offset associated with the NPDCCH communication and the NPUSCH communication.

In a twenty-first aspect, alone or in combination with one or more of the first through twentieth aspects, the downlink communication is an NPDCCH communication, the uplink communication is a physical downlink control channel (PDCCH)-ordered narrowband physical random access channel (NPRACH) communication, and the first value is based at least in part on a scheduling offset that is associated with the NPDCCH communication and the PDCCH-ordered NPRACH communication.

In a twenty-second aspect, alone or in combination with one or more of the first through twenty-first aspects, the downlink communication is a physical downlink shared channel (PDSCH) communication, the uplink communication is a HARQ-ACK, and the first value is based at least in part on a scheduling offset associated with the PDSCH communication and the HARQ-ACK.

In a twenty-third aspect, alone or in combination with one or more of the first through twenty-second aspects, the downlink communication is a physical downlink control channel (PDCCH) communication, the uplink communication is a physical uplink shared channel (PUSCH) communication, and the first value is based at least in part on a scheduling offset associated with the PDCCH communication and the PUSCH communication.

In a twenty-fourth aspect, alone or in combination with one or more of the first through twenty-third aspects, the downlink communication is a PDCCH communication, the uplink communication is a PDCCH-ordered physical random access channel (PRACH) communication, and the first value is based at least in part on a scheduling offset that is associated with the PDCCH communication and the PDCCH-ordered PRACH communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
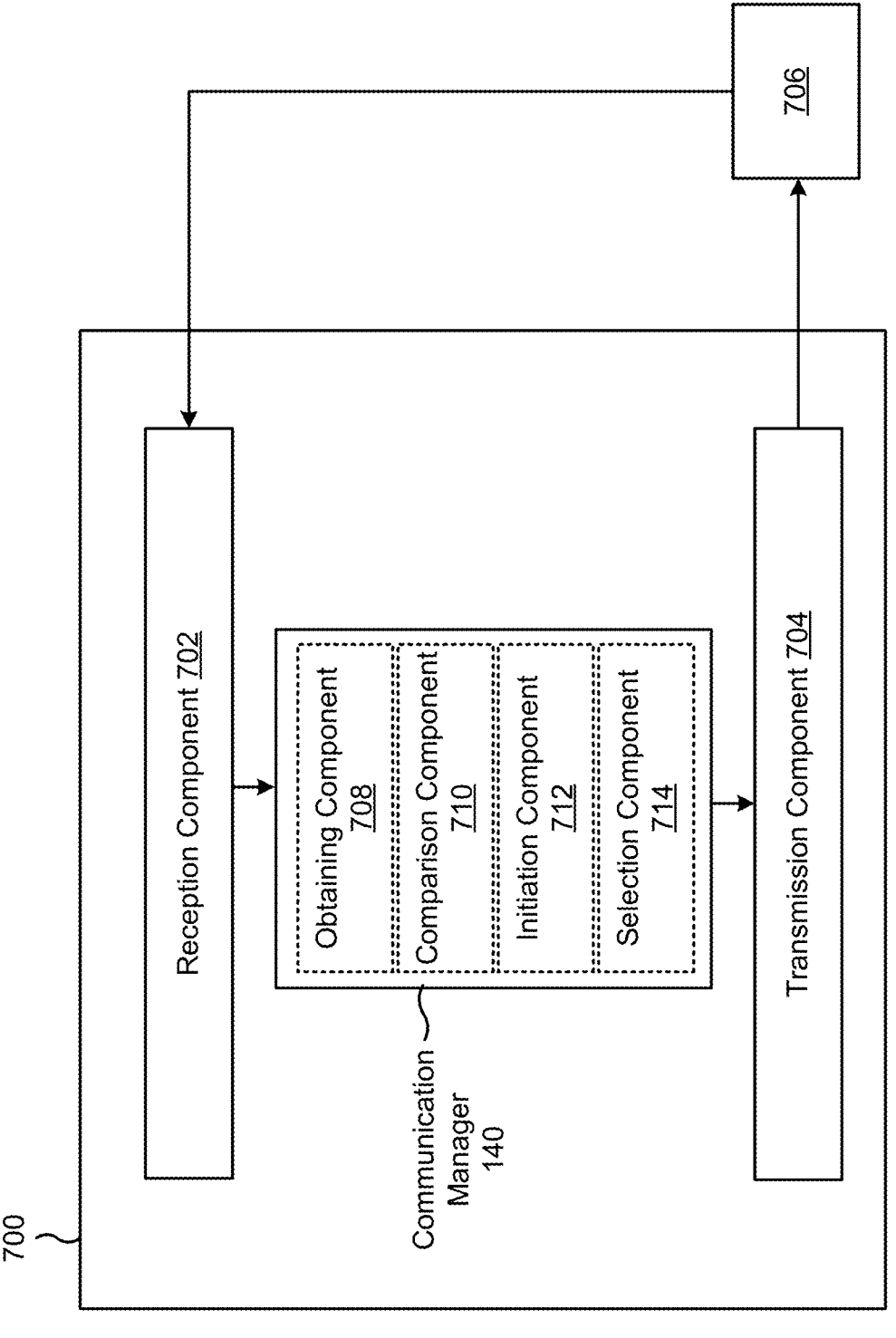
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an obtaining component 708, a comparison component 710, an initiation component 712, or a selection component 714, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The obtaining component 708 may obtain a first value associated with transmitting an uplink communication that corresponds to a downlink communication received in an NTN. The comparison component 710 may compare the first value to a second value. The transmission component 704 may selectively transmit the uplink communication, or selectively process the downlink communication, based at least in part on a result of comparing the first value to the second value.

The initiation component 712 may initiate a radio link failure, transition to an idle state, or wait to be released from a connection by a network node based at least in part on the configured NTN scheduling offset being less than the NTN timing advance value. The initiation component 712 may initiate a radio link failure, transition to an idle state, or wait to be released from a connection by a network node based at least in part on the first processing time being less than the second processing time. The selection component 714 may select a scheduling offset from the plurality of scheduling offsets such that the first value that corresponds to a first processing time is greater than or equal to the second value that corresponds to a second processing time. The initiation component 712 may initiate a radio link failure, transition to an idle state, or wait to be released from a connection by a network node based at least in part on the first value being less than the minimum physical time.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: obtaining a first value associated with transmitting an uplink communication that corresponds to a downlink communication received in a non-terrestrial network (NTN); comparing the first value to a second value; and selectively transmitting the uplink communication, or selectively processing the downlink communication, based at least in part on a result of comparing the first value to the second value.

Aspect 2: The method of Aspect 1, wherein obtaining the first value comprises calculating the first value based at least in part on one or more configured values.

Aspect 3: The method of any of Aspects 1-2, wherein the first value corresponds to a configured NTN scheduling offset and the second value corresponds to an NTN timing advance value.

Aspect 4: The method of Aspect 3, wherein the NTN timing advance value is based at least in part on one or more of a common timing advance value, a UE-specific timing advance value, or a constant.

Aspect 5: The method of Aspect 3, wherein selectively transmitting the uplink communication based at least in part on the result of comparing the first value to the second value comprises: transmitting the uplink communication based at least in part on the configured NTN scheduling offset being greater than or equal to the NTN timing advance value; or refraining from transmitting the uplink communication, or refraining from processing the downlink communication, based at least in part on the configured NTN scheduling offset being less than the NTN timing advance value.

Aspect 6: The method of Aspect 3, further comprising initiating a radio link failure, transitioning to an idle state, or waiting to be released from a connection by a network node based at least in part on the configured NTN scheduling offset being less than the NTN timing advance value.

Aspect 7: The method of any of Aspects 1-6, wherein the first value is a first processing time that corresponds to a time between receiving the downlink communication and transmitting the uplink communication, and wherein the second value is a second processing time that corresponds to a minimum processing time for communications in a terrestrial network.

Aspect 8: The method of Aspect 7, wherein the first processing time is based at least in part on one or more of a configured scheduling offset, an NTN-specific scheduling offset, or an NTN timing advance value.

Aspect 9: The method of Aspect 7, wherein the second processing time is based at least in part on one or more of a minimum configured scheduling offset or a maximum timing advance value for communications in the terrestrial network.

Aspect 10: The method of Aspect 7, wherein selectively transmitting the uplink communication based at least in part on the result of comparing the first value to the second value comprises: transmitting the uplink communication based at least in part on the first processing time being greater than or equal to the second processing time; or refraining from transmitting the uplink communication, or refraining from processing the downlink communication, based at least in part on the first processing time being less than the second processing time.

Aspect 11: The method of Aspect 7, further comprising initiating a radio link failure, transitioning to an idle state, or waiting to be released from a connection by a network node based at least in part on the first processing time being less than the second processing time.

Aspect 12: The method of any of Aspects 1-11, wherein the first value is based at least in part on a scheduling offset, wherein the UE is configured with a scheduling offset from among a plurality of scheduling offsets, and wherein at least a portion of the plurality of scheduling offsets are specific to NTN.

Aspect 13: The method of Aspect 12, further comprising selecting a scheduling offset from the plurality of scheduling offsets such that the first value that corresponds to a first processing time is greater than or equal to the second value that corresponds to a second processing time.

Aspect 14: The method of any of Aspects 1-13, wherein the second value is a minimum physical time for the UE to process the downlink communication.

Aspect 15: The method of Aspect 14, wherein selectively transmitting the uplink communication based at least in part on the result of comparing the first value to the second value comprises: transmitting the uplink communication based at least in part on the first value being greater than or equal to the minimum physical time; or refraining from transmitting the uplink communication, or refraining from processing the downlink communication, based at least in part on the first value being less than the minimum physical time.

Aspect 16: The method of Aspect 14, further comprising initiating a radio link failure, transitioning to an idle state, or waiting to be released from a connection by a network node based at least in part on the first value being less than the minimum physical time.

Aspect 17: The method of any of Aspects 1-16, wherein selectively transmitting the uplink communication comprises refraining from transmitting a portion of the uplink communication that occurs before a minimum processing time for communications associated with a terrestrial network.

Aspect 18: The method of Aspect 17, wherein refraining from transmitting the portion of the uplink communication comprises dropping a slot, a symbol, a subframe, a repetition unit, or a repetition associated with the uplink communication.

Aspect 19: The method of Aspect 17, wherein refraining from transmitting the portion of the uplink communication comprises transmitting the portion of the uplink communication after the minimum processing time for communications associated with the terrestrial network.

Aspect 20: The method of any of Aspects 1-19, wherein the downlink communication is a narrowband physical downlink shared channel (NPDSCH) communication, the uplink communication is a hybrid automatic repeat request acknowledgement (HARQ-ACK), and the first value is based at least in part on a scheduling offset associated with the NPDSCH communication and the HARQ-ACK.

Aspect 21: The method of any of Aspects 1-20, wherein the downlink communication is a narrowband physical downlink control channel (NPDCCH) communication, the uplink communication is a narrowband physical uplink shared channel (NPUSCH) communication, and the first value is based at least in part on a scheduling offset associated with the NPDCCH communication and the NPUSCH communication.

Aspect 22: The method of any of Aspects 1-21, wherein the downlink communication is a narrowband physical downlink control channel (NPDCCH) communication, the uplink communication is a physical downlink control channel (PDCCH)-ordered narrowband physical random access channel (NPRACH) communication, and the first value is based at least in part on a scheduling offset that is associated with the NPDCCH communication and the PDCCH-ordered NPRACH communication.

Aspect 23: The method of any of Aspects 1-22, wherein the downlink communication is a physical downlink shared channel (PDSCH) communication, the uplink communication is a hybrid automatic repeat request acknowledgement (HARQ-ACK), and the first value is based at least in part on a scheduling offset associated with the PDSCH communication and the HARQ-ACK.

Aspect 24: The method of any of Aspects 1-23, wherein the downlink communication is a physical downlink control channel (PDCCH) communication, the uplink communication is a physical uplink shared channel (PUSCH) communication, and the first value is based at least in part on a scheduling offset associated with the PDCCH communication and the PUSCH communication.

Aspect 25: The method of any of Aspects 1-24, wherein the downlink communication is a physical downlink control channel (PDCCH) communication, the uplink communication is a physical downlink control channel (PDCCH)-ordered physical random access channel (PRACH) communication, and the first value is based at least in part on a scheduling offset that is associated with the PDCCH communication and the PDCCH-ordered PRACH communication.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising one or more memories and one or more processors coupled to the one or more memories, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

obtain a first value associated with transmitting an uplink communication that corresponds to a downlink communication received in a non-terrestrial network (NTN), wherein the first value is a first processing time that is based at least in part on an NTN scheduling offset, a scheduling offset associated with the downlink communication, and an NTN timing advance value;

obtain a second value comprising a minimum processing time needed for processing communications in a terrestrial network based at least in part on a difference of a minimum configured scheduling offset of a plurality of configured scheduling offsets specific to the NTN for the downlink communication and a maximum processing time needed for processing communications in the terrestrial network;

compare, by the UE, the first value to the second value; and selectively transmit the uplink communication, or selectively process the downlink communication, based at least in part on a result of comparing the first value to the second value.

2. The apparatus of claim 1, wherein the one or more processors, to obtain the first value, are configured to calculate the first value based at least in part on one or more configured values.

3. The apparatus of claim 1, wherein the first value corresponds to a time between receiving the downlink communication and transmitting the uplink communication, and wherein the second value corresponds to the minimum processing time for communications in the terrestrial network.

4. The apparatus of claim 3, wherein the one or more processors, to selectively transmit the uplink communication based at least in part on the result of comparing the first value to the second value, are configured to:

transmit the uplink communication based at least in part on the first processing time being greater than or equal to the minimum processing time; or refrain from transmitting the uplink communication, or refrain from processing the downlink communication, based at least in part on the first processing time being less than the minimum processing time.

5. The apparatus of claim 3, wherein the one or more processors are further configured to initiate a radio link failure, transition to an idle state, or wait to be released from a connection by a network node based at least in part on the first processing time being less than the minimum processing time.

6. The apparatus of claim 1, wherein the UE is configured with the scheduling offset associated with the downlink communication from among a plurality of scheduling offsets, and wherein at least a portion of the plurality of scheduling offsets are specific to NTN.

7. The apparatus of claim 6, wherein the one or more processors are further configured to select the scheduling offset associated with the downlink communication from the plurality of scheduling offsets such that the first value is greater than or equal to the second value.

8. The apparatus of claim 1, wherein the second value is a minimum physical time for the UE to process the downlink communication.

9. The apparatus of claim 8, wherein the one or more processors, to selectively transmit the uplink communication based at least in part on the result of comparing the first value to the second value, are configured to:

transmit the uplink communication based at least in part on the first value being greater than or equal to the minimum physical time; or refrain from transmitting the uplink communication, or refrain from processing the downlink communication, based at least in part on the first value being less than the minimum physical time.

10. The apparatus of claim 8, wherein the one or more processors are further configured to initiate a radio link failure, transition to an idle state, or wait to be released from a connection by a network node based at least in part on the first value being less than the minimum physical time.

11. The apparatus of claim 1, wherein the one or more processors, to selectively transmit the uplink communication, are configured to refrain from transmitting a portion of the uplink communication that occurs before a minimum processing time for communications associated with the terrestrial network.

12. The apparatus of claim 11, wherein the one or more processors, to refrain from transmitting the portion of the uplink communication, are configured to drop a slot, a symbol, a subframe, a repetition unit, or a repetition associated with the uplink communication.

13. The apparatus of claim 11, wherein the one or more processors, to refrain from transmitting the portion of the uplink communication, are configured to transmit the portion of the uplink communication after the minimum processing time for communications associated with the terrestrial network.

14. The apparatus of claim 1, wherein the downlink communication is a narrowband physical downlink shared channel (NPDSCH) communication, the uplink communication is a hybrid automatic repeat request acknowledgement (HARQ-ACK), and the first value is based at least in part on a scheduling offset associated with the NPDSCH communication and the HARQ-ACK.

15. The apparatus of claim 1, wherein the downlink communication is a narrowband physical downlink control channel (NPDCCH) communication, the uplink communication is a narrowband physical uplink shared channel (NPUSCH) communication, and the first value is based at least in part on a scheduling offset associated with the NPDCCH communication and the NPUSCH communication.

16. The apparatus of claim 1, wherein the downlink communication is a narrowband physical downlink control channel (NPDCCH) communication, the uplink communication is a physical downlink control channel (PDCCH)-ordered narrowband physical random access channel (NPRACH) communication, and the first value is based at least in part on a scheduling offset that is associated with the NPDCCH communication and the PDCCH-ordered NPRACH communication.

17. The apparatus of claim 1, wherein the downlink communication is a physical downlink shared channel (PDSCH) communication, the uplink communication is a hybrid automatic repeat request acknowledgement (HARQ-ACK), and the first value is based at least in part on a scheduling offset associated with the PDSCH communication and the HARQ-ACK.

18. The apparatus of claim 1, wherein the downlink communication is a physical downlink control channel (PDCCH) communication, the uplink communication is a physical uplink shared channel (PUSCH) communication, and the first value is based at least in part on a scheduling offset associated with the PDCCH communication and the PUSCH communication.

19. The apparatus of claim 1, wherein the downlink communication is a physical downlink control channel (PDCCH) communication, the uplink communication is a physical downlink control channel (PDCCH)-ordered physical random access channel (PRACH) communication, and the first value is based at least in part on a scheduling offset that is associated with the PDCCH communication and the PDCCH-ordered PRACH communication.

20. A method of wireless communication performed by a user equipment (UE), comprising:

obtaining a first value associated with transmitting an uplink communication that corresponds to a downlink communication received in a non-terrestrial network (NTN), wherein the first value is a first processing time that is based at least in part on an NTN scheduling offset, a scheduling offset associated with the downlink communication, and an NTN timing advance value;

obtaining a second value comprising a minimum processing time needed for processing communications in a terrestrial network based at least in part on a difference of a minimum configured scheduling offset of a plurality of configured scheduling offsets specific to the NTN for the downlink communication and a maximum processing time needed for processing communications in the terrestrial network;

comparing, by the UE, the first value to the second value; and selectively transmitting the uplink communication, or selectively processing the downlink communication, based at least in part on a result of comparing the first value to the second value.

21. The method of claim 20, wherein obtaining the first value comprises calculating the first value based at least in part on one or more configured values.

22. The method of claim 20, wherein the first value corresponds to a time between receiving the downlink communication and transmitting the uplink communication, and wherein the second value corresponds to a minimum processing time for communications in the terrestrial network.

23. The method of claim 22, wherein selectively transmitting the uplink communication based at least in part on the result of comparing the first value to the second value comprises:

transmitting the uplink communication based at least in part on the first processing time being greater than or equal to the minimum processing time; or refraining from transmitting the uplink communication, or refraining from processing the downlink communication, based at least in part on the first processing time being less than the minimum processing time.

24. The method of claim 22, further comprising initiating a radio link failure, transitioning to an idle state, or waiting to be released from a connection by a network node based at least in part on the first processing time being less than the minimum processing time.

25. The method of claim 20, wherein the UE is configured with the scheduling offset associated with the downlink communication from among a plurality of scheduling offsets, and wherein at least a portion of the plurality of scheduling offsets are specific to NTN.

26. The method of claim 25, further comprising selecting the scheduling offset associated with the downlink communication from the plurality of scheduling offsets such that the first value is greater than or equal to the second value.

27. The method of claim 20, wherein the second value is a minimum physical time for the UE to process the downlink communication.

28. The method of claim 27, wherein selectively transmitting the uplink communication based at least in part on the result of comparing the first value to the second value comprises:

transmitting the uplink communication based at least in part on the first value being greater than or equal to the minimum physical time; or refraining from transmitting the uplink communication, or refraining from processing the downlink communication, based at least in part on the first value being less than the minimum physical time.

29. The method of claim 27, further comprising initiating a radio link failure, transitioning to an idle state, or waiting to be released from a connection by a network node based at least in part on the first value being less than the minimum physical time.

30. The method of claim 20, wherein selectively transmitting the uplink communication comprises refraining from transmitting a portion of the uplink communication that occurs before a minimum processing time for communications associated with the terrestrial network.

\*    \*    \*    \*    \*